United States Patent
Van Bezooijen et al.

(10) Patent No.: US 12,451,922 B2
(45) Date of Patent: Oct. 21, 2025

(54) COMPUTATION-BASED DETUNING OF COUPLED ANTENNAS

(71) Applicant: QUALCOMM Incorporated, San Diego, CA (US)

(72) Inventors: Adrianus Van Bezooijen, Molenhoek (NL); Francesco Gatta, San Diego, CA (US); Erwin Spits, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 539 days.

(21) Appl. No.: 17/949,174

(22) Filed: Sep. 20, 2022

(65) Prior Publication Data

US 2024/0097736 A1    Mar. 21, 2024

(51) Int. Cl.
*H04B 1/50* (2006.01)
*H04B 1/04* (2006.01)
*H04B 1/16* (2006.01)

(52) U.S. Cl.
CPC .............. *H04B 1/50* (2013.01); *H04B 1/04* (2013.01); *H04B 1/1607* (2013.01); *H04B 2001/0408* (2013.01)

(58) Field of Classification Search
CPC ...... H01Q 1/525; H04B 17/12; H04B 1/0458; H04B 1/04–0483; H04B 2001/0408–0491; H04B 1/50–588; H04B 1/16–1607; H04B 17/00–409
See application file for complete search history.

(56) References Cited

U.S. PATENT DOCUMENTS

| | | |
|---|---|---|
| 6,055,422 A | 4/2000 | Saitoh |
| 10,673,514 B1 | 6/2020 | Klomsdorf |
| 2011/0116423 A1* | 5/2011 | Rousu ............ H04B 1/18 455/75 |
| 2014/0370827 A1 | 12/2014 | Nakamura et al. |

OTHER PUBLICATIONS

National Institute of Standards and Technology (NIST) glossary meaning of "switch", printed on Jun. 8, 2025. Retrieved from Internet: < https://csrc.nist.gov/glossary/term/switch> (Year: 2025).*
International Search Report and Written Opinion—PCT/US2023/031319—ISA/EPO—Dec. 15, 2023.

* cited by examiner

*Primary Examiner* — Ronald Eisner
(74) *Attorney, Agent, or Firm* — Polsinelli/Qualcomm Incorporated

(57) ABSTRACT

A user equipment (UE) is provided that detunes a receive antenna while a transmit antenna transmits. To determine the detuning, the UE first transmits a signal through the transmit antenna while the receive antenna is sequentially coupled through known loads. At each load, the UE determines an input reflection coefficient for a transmit path to the transmit antenna. Based upon the known loads and the corresponding input reflection coefficients, the UE determines a load to couple to the receive antenna to perform the detuning.

16 Claims, 6 Drawing Sheets

COMPUTATION-BASED DETUNING OF COUPLED ANTENNAS

FIELD OF TECHNOLOGY

The present disclosure relates generally to wireless communication and more specifically to detuning of coupled antennas.

BACKGROUND

To achieve ever higher data rates in modern wireless communication systems such as fifth generation (5G) systems, cellular handsets have evolved to employ an array of antennas. Using an array of antennas as compared to a single antenna has several advantages. For example, as the received signal strength drops, the signal-to-noise ratio becomes a limiting factor on the achievable data rate. But the use of multiple receive antennas enables multiple-in-multiple-out (MIMO) and beamforming techniques to increase the received signal strength and thus enhance the achievable data rate. A user equipment (UE) such as a cellular handset may thus use separate transmit and receive antennas.

As the number of transmit and receive antennas increases, the coupling among antennas may also increase. For example, a transmit antenna may couple to a receive antenna such that the transmit power is then dissipated in a low-noise amplifier coupled to the receive antenna. The coupling thus causes a loss in total radiated power (TRP). But each transmit and receive antenna in a UE may have a unique orientation and position within the UE, which results in different coupling levels between any two antennas. Moreover, the antenna coupling may change depending upon how a user handles the UE. In addition, antenna coupling affects the antenna impedance. Coupling between antennas in a UE is thus problematic.

SUMMARY

The following summary discusses some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with an aspect of the disclosure, an apparatus for wireless communication is provided that includes: a plurality of antennas including a first antenna and a second antenna; a first amplifier; a plurality of loads; an antenna switch module; an antenna switch array having a first configuration in which an output signal path from the first amplifier is coupled to the first antenna and in which the antenna switch module is coupled to the second antenna; wherein the antenna switch module is configured to couple to a selected load from the plurality of loads during a calibration mode; and a signal detector configured to detect a forward signal from the output signal path to provide a detected forward signal and to detect a reflected signal from the output signal path to provide a detected reflected signal.

In accordance with another aspect of the disclosure, a user equipment (UE) for wireless communication is provided that includes: a plurality of antennas including a transmit antenna and a receive antenna; a power amplifier; a low-noise amplifier; an adjustable load; an antenna switch module having a first configuration the antenna switch module is coupled to the low-noise amplifier and having a second configuration in which the antenna switch module is coupled to the adjustable load; an antenna switch array having a first configuration in which an output signal path from the power amplifier is coupled to the transmit antenna and in which the antenna switch module is coupled to the receive antenna; and a signal detector configured to detect a forward signal from the output signal path and a reflected signal from the output signal path.

In accordance with yet another aspect of the disclosure, a method for wireless communication is provided that includes: propagating a forward signal through a transmit path to transmit the forward signal from a first antenna of a user equipment; during the transmitting of the forward signal from the first antenna, coupling a second antenna of the user equipment to each load from a plurality of loads; for each load, determining a ratio of a reflected signal from the transmit path to the forward signal to provide a plurality of ratios; determining a scattering parameter responsive to a function of the plurality of ratios and the plurality of loads; and detuning the second antenna based upon a determination of the scattering parameter.

Finally, in accordance with another aspect of the disclosure, a user equipment for wireless communication is provided that includes: a first antenna; a second antenna; a power amplifier; a directional coupler coupled between the power amplifier and the first antenna; a low-noise amplifier; a plurality of loads; and a controller configured to: control the second antenna to disconnect from the low-noise amplifier and connect to a selected load from the plurality loads while the power amplifier is transmitting through the first antenna.

Other aspects, features, and implementations of the present disclosure will become apparent to those of ordinary skill in the art, upon reviewing the following description of specific, exemplary implementations of the present disclosure in conjunction with the accompanying figures. While features of the present disclosure may be discussed relative to certain implementations and figures below, all implementations of the present disclosure can include one or more of the advantageous features discussed herein. In other words, while one or more implementations may be discussed as having certain advantageous features, one or more of such features may also be used in accordance with the various implementations of the disclosure discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various implementations and to explain various principles and advantages in accordance with the present disclosure.

DETAILED DESCRIPTION

Figure 1:
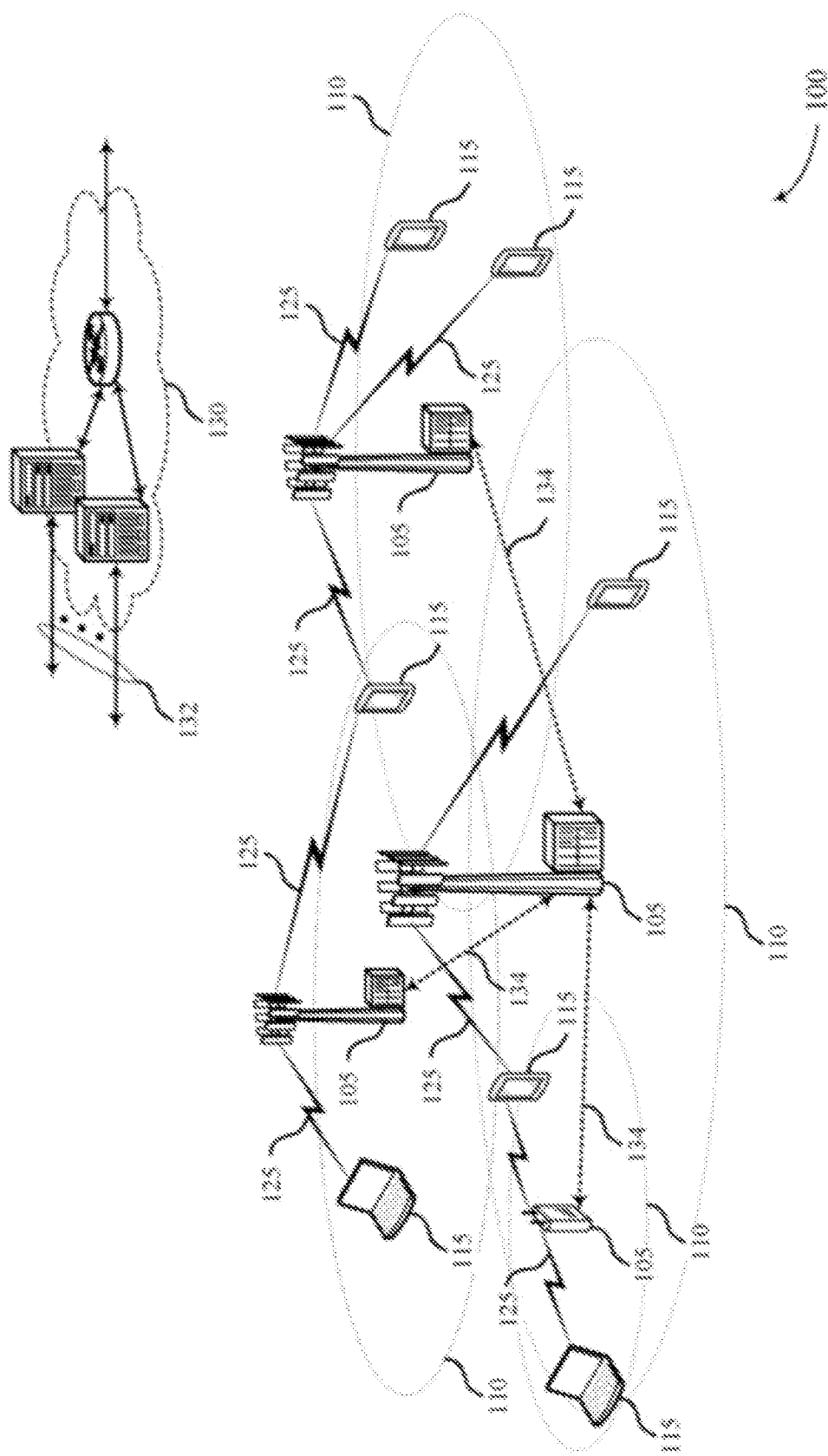
FIG. 1 illustrates an example of a system for wireless communication in which the UEs may practice computation-based detuning in accordance with aspects of the present disclosure.

The following detailed description is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

To address the mutual coupling between a transmit antenna and a neighboring receive antenna, a wireless communication device (also referred to as user equipment (UE)) is disclosed that detunes the receive antenna to reduce the mutual coupling. To provide this detuning, each receive antenna may couple to the UE's receiver through an antenna switch module (ASM). The ASM has an operating state and also a plurality of known load states. In the operating state (also denoted herein as an operation mode), the ASM couples its receive antenna to a receive path in the receiver. Such operation is conventional such that the following discussion will focus on the use of the known load states. These known load states are used sequentially during a characterization mode of operation in which a transmit antenna is transmitting and mutually coupling to the receive antenna. For example, the characterization mode may include using three known load states, as described below.

In the characterization mode, a directional coupler samples a forward signal propagating from a power amplifier to the transmit antenna and also samples a reflected signal propagating from the transmit antenna back to the power amplifier so that a reflection coefficient may be determined. The reflection coefficient depends upon the scattering parameters between the transmit antenna and the receive antenna as well as the load selected by the antenna switch module. There are four scattering parameters in such a two-port network: a first port corresponding to the input/output terminal for the transmit antenna and a second port corresponding to the input/output terminal for the receive antenna. A first scattering parameter $S_{11}$ represents how much power is reflected from the first port. A second scattering parameter $S_{22}$ represents how much power is reflected from the second port. A third scattering parameter $S_{21}$ represents how much power is coupled from the first port to the second port whereas a fourth scattering parameter $S_{12}$ represents how much power is coupled from the second port to the first port.

Since the two-port network is passive, the scattering parameters $S_{21}$ and $S_{12}$ are equal. There are thus three unknowns in characterizing the scattering parameters between a transmit antenna and a receive antenna. As shown herein, the reflection coefficient is a linear function of these three unknowns and the known loads selected by the antenna switch module. Each reflection coefficient measurement thus relates to the three unknown scattering parameters through a linear equation of the three unknown scattering parameters and the corresponding load. By sequencing through the three loads and measuring the corresponding reflection coefficients as determined by sampling the forward and reverse signals at the directional coupler between the power amplifier and the transmit antenna, a UE may then solve for the scattering parameters.

With the scattering parameters determined, the UE may then determine which of the three loads minimizes the coupling between the transmit antenna and the receive antenna. During a subsequent transmission by the transmit antenna during an detuning portion of an operation mode, the UE may control the antenna switch module to apply the determined load to the receive antenna. The receive antenna is thus detuned with respect to the transmit antenna so that the total radiated power from the transmit antenna may be maximized. For example, during a subsequent data transmission, the transmitter may modulate a radio frequency (RF) carrier signal with data to obtain a modulated signal, amplify the modulated signal to obtain an output RF signal having the proper output power level, filter the output RF signal, and transmit the output RF signal via one or more transmit (TX) antennas to a base station while the corresponding receive antenna(s) are detuned. During data reception, the UE may control the antenna switch module to select for the receive path that includes a low noise amplifier (LNA), a filter, and other suitable components. During a receive portion of the operation mode in which the receive antenna is used to receive signals, the antenna switch module does not apply the determined load to the receive antenna. There are thus two portions or sub-modes to the operation mode: a detuning portion in which the receive antenna is not used to receive but instead is detuned and a receive portion in which the receive antenna is used to receive and is thus not detuned.

Since the scattering parameters will vary as the user handles the UE and in response to changes in other conditions such as in beamforming and beamsteering, the detuning process may be periodically repeated. During one scattering parameter state, it may be a first load that provides the best detuning whereas a different load provides the best detuning during another scattering parameter state. In the detuned state, the portion of the transmitted power that would otherwise couple to the receive path is instead re-radiated by the receive antenna, which improves the TRP.

The signal transmitted by the UE during the determination of the scattering parameters may be a reference signal. In a UE transceiver, a radio frequency frontend circuit (RFFE) may transmit the reference signal to the transmit antenna. A directional coupler positioned between the RFFE and the transmit antenna may be configured to measure the magnitude and phase of the forward signal and magnitude and phase of the reverse signal. In some implementations, only the magnitude of the forward and reverse signals is detected.

In some implementations, the antenna switch module may select for a tunable load. With the scattering parameters determined, the UE may then adjust the tunable load to an optimum value, or a value relatively close to the optimum value, to better detune the coupled antenna from the transmit antenna when the transmit antenna is transmitting. Alternatively, the loads selected for by the antenna switch module may be fixed loads such as an open circuit, a closed circuit, and a capacitive load. With the scattering parameters determined, the UE may then select from these fixed loads the fixed load that provides the best detuning. Although such a detuning may be sub-optimal as compared to the adjusting of a variable load, the resulting detuning may be satisfactory and also results in lowered design complexity and cost. Regardless of whether the loads are fixed or variable, the computation-based detuning is self-contained within the UE, allowing the UE to detune dynamically during operations. In some configurations, this may reduce or eliminate the need to perform time-consuming TRP measurements in an antenna test range or chamber prior to the operations.

The computation-based detuning technique as discussed herein may allow a UE to detect coupling between any pair of antennas, including TX and RX antennas, by using reference signal(s). When one of the TX antennas is transmitting a reference signal, the UE may determine the scattering parameters between the transmitting antenna and the receive antenna to find the optimum loading to effectively detune the coupling to the receive antenna. The set of optimum loading (or values closest to the optimum loading) for coupled antennas may be recorded by the UE and used for a period of time following the scattering parameter determination.

A wireless system may employ various types of reference signals to provide channel estimation for adaptive multi-antenna operation in uplink and/or downlink directions. For example, a channel state information reference signal (CSI-RS) may be used on a downlink from the base station to aid the base station in beam forming determination, an uplink demodulation reference signal (DM-RS) specific to each UE may be used to estimate channel information for the uplink, and each UE may use a sounding reference signal (SRS) on the uplink to aid in scheduling (e.g., determining which frequency bands are good or bad for data). Taking SRS as an example, a UE may transmit an SRS sequentially through all its antennas, including TX and RX antennas, to the base station. The base station, in turn, may characterize the uplink channel based on the SRS received. An RX antenna thus functions as a transmit antenna by transmitting an SRS. The antenna coupling measurements disclosed herein are thus applicable between any pair of antennas: from a TX antenna to an RX antenna, from an RX antenna to another RX antenna, and so on. It will be understood that while the terms "TX antenna" and "RX antenna" are used herein, there may be times, modes, or configurations in which a TX antenna operates to receive and/or there may be times, modes, or configurations in which an RX antenna operates to transmit.

To better appreciate the advantageous properties of this computation-based detuning, aspects of the disclosure are initially described in the context of a wireless communication system. FIG. 1 illustrates an example of a wireless communication system 100 that supports computation-based detuning. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communication, ultra-reliable (e.g., mission critical) communication, low latency communication, or communication with low-cost and low-complexity devices. The techniques described herein may be applicable to positioning in 5G NR and future releases, and/or may be applicable to detection of a user of a UE 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like, and/or may be able to communicate directly with each other.

Each base station 105 may be associated with a geographic coverage area 110 in which communication with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

One or more UEs 115 support computation-based detuning as will be explained further herein. UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or a machine-type communication (MTC) device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communication from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Wireless communication system 100 may operate using one or more frequency bands, such as in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the lower frequencies and longer wavelengths of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz or higher), also known as the millimeter band (which may also include some frequencies in the 20 GHz range in certain systems). In some examples, wireless communication system 100 may support millimeter wave (mmW) communication between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions.

Each UE 115 is equipped with multiple antennas, which may be used to employ techniques such as transmit diversity, receive diversity, multiple-input multiple-output (MIMO) communication, or beamforming. For example, wireless communication system 100 may use a transmission scheme between a transmitting device (e.g., a base station 105 in downlink) and a receiving device (e.g., a UE 115 in downlink), where the transmitting device is equipped with multiple antennas and the receiving device is equipped with one or more antennas. MIMO communication may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying one or more amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

Figure 2:
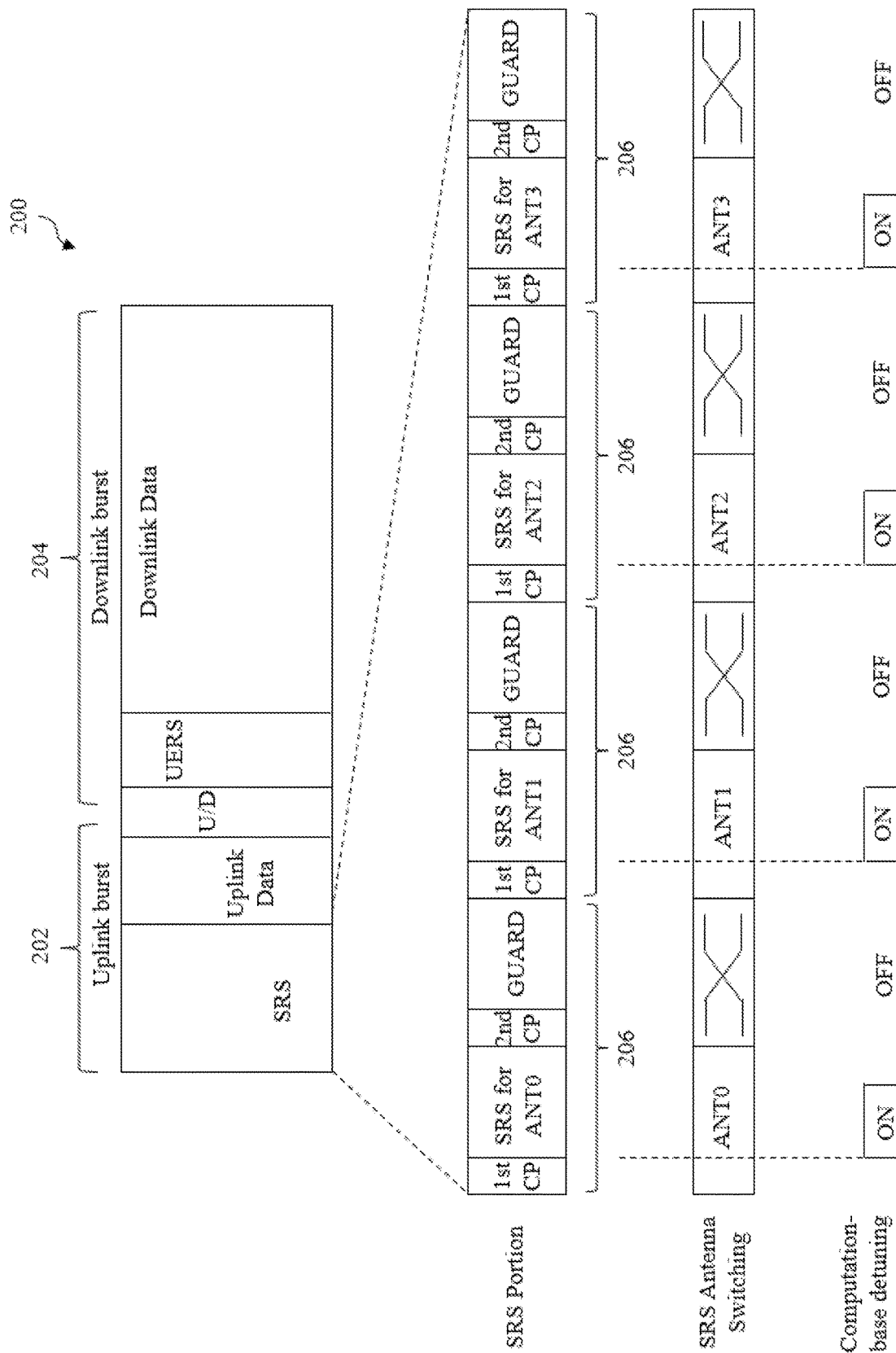
FIG. 2 illustrates an example subframe structure that includes sounding reference signal portions in accordance with an aspect of the present disclosure.

Communication between a UE 115 and a base station 105 can be divided in time domain into subframes (SFs). Referring now to FIG. 2, an example SF 200 is illustrated that allocates a multiplexed sounding reference signal (SRS). In an embodiment, the subframe structure 200 operates within a short timeframe of approximately 500 microseconds, though it may also be shorter or longer than that. The short timeframe allows the base station 105 to essentially "freeze" the channel state for the duration of the subframe to minimize the effects of channel decorrelation.

The computation-based detuning described herein is not limited to any particular type of transmitted signal. The following discussion of the use of an SRS as the transmitted signal used during the computation-based detuning is thus merely exemplary. It is convenient, however, to use an SRS as the transmitted signal during computation-based detuning since the SRS in a 5G system is sequenced through each TX and RX antenna. If the computation-based detuning computations are performed during an SRS transmission, the computation-based detuning need add no additional latency as compared to conventional SRS operation.

A single subframe is illustrated in FIG. 2 for ease of illustration; as will be recognized, the structure of the SF 200 is scalable to any number of subframes as necessary or desired. Each SF 200 includes a plurality of time slots 206 with each time slot 206 including a plurality of orthogonal frequency division multiplexing (OFDM) symbols. The various time slots 206 in a SF 200 may be divided into an uplink portion 202 and a downlink portion 204, separated by a transition portion U/D. As part of the uplink portion 202, the UE 115 may send various types of signals to the base station 105. These may include, for example, an SRS, uplink data, and optionally requests for information (e.g., in an uplink burst). The transition portion U/D is provided between the uplink portion 202 and the downlink portion 204. During the downlink portion 204, the base station 105 sends various types of signals to the UE 115, including for example a user-equipment reference signal (UERS) and downlink data (e.g., in a downlink burst). In some embodiments, the base station 105 may use the SRS in the UL portion 202 to derive information that facilitates the downlink between the UE 115 and the base station 105. For example, the base station 105 is able to train its antennas based on the SRS to beamform the downlink data transmitted back to the UE 115 so that, for instance, interference with other UEs in the range of the base station 105 is reduced.

Inside time slot 206, an SRS may span one, two, or four consecutive OFDM symbols that are located within the last six OFDM symbols of the time slot 206. Each antenna may transmit its own SRS such that the sounding reference signals are multiplexed across a UE's antennas, each antenna having its own SRS in a corresponding time slot 206. Each slot 206 may contain a first cyclic prefix (CP) prepended to the OFDM symbols for multiplexed SRS. Each slot 206 may also contain a second CP prepended to a guard period before the next slot starts. The guard period ensures enough time for the UE 115 to perform SRS antenna switching. Also illustrated in FIG. 2 is the timing of SRS antenna switching and computation-based detuning. At the beginning of a slot 206, an SRS-switching antenna switch is configured to couple a transmit path to the selected antenna to prepare for transmitting the multiplexed SRS. When the selected antenna starts transmitting the multiplexed SRS, a computation-based detuning is also performed ("ON"). In some implementations, a duration of computation-based detuning of one coupled antenna is shorter than the transmission of the multiplexed SRS by the selected antenna, such that the detuning is finished ("OFF") before the $2^{nd}$ CP prepended to the guard period begins. The computation-based detuning for another pair of coupled antennas (or for the same pair) begins with a transmission of a subsequent multiplexed SRS. For example, a first SRS transmission over OFDM symbols in a first slot 206 may be used to determine the coupling and detuning between a first pair of antennas, a second SRS transmission in a second slot 206 may be used to determine the coupling and detuning between a second pair of antennas, and so on. In some examples, an antenna from the first pair of antennas is also included in the second pair of antennas.

The four slots 206 shown in FIG. 2 are for illustrative purpose and not limiting. The number of SRS transmissions used for the computation-based detuning may be greater or fewer than four SRS transmissions in sequence depending on the number of antennas that need detuning in a UE 115. Further, the multiplexed SRS transmission sequence and corresponding computation-based detuning may be repeated over time depending upon the desired computation-based detuning updating or refreshing. The repeated SRS transmissions also allows the UE 115 to collect optimum detuning settings for the same antenna multiple times at different repeated slots 206 and average the values to provide an improved detuning. Among the slots 206, the multiplexed SRS may be identical for the various antennas. Alternatively, the multiplexed SRS may be unique for each antenna, such that the base station 105 is able to identify which antenna is transmitting the respective received SRS. Computation-based detuning may be performed in sequential time slots, as illustrated, or may be performed in discontinuous time slots or only in certain selected time slots (for example, based on a determination that it would be beneficial to update one or more parameters between a certain pair of antennas). Some example UE architectures for computation-based detuning will now be discussed in more detail.

Computation-Based Detuning with Adjustable Loading

As noted earlier, a pair of antennas being characterized by computation-based detuning may be deemed to form a two-port network. The input/output terminal to a first antenna forms a first port of this two-port network whereas the input/output terminal to a second antenna forms a second port. An antenna switch module switches so as to sequentially apply different loads to the second port while a transmitter drives the first port to cause the first antenna to transmit. A directional coupler coupled to the first port measures or determines a reflection coefficient. From the measured reflection coefficients and the known loads, a UE may then determine the scattering parameters for the two-port network in this example and detune the second antenna accordingly.

Figure 3:
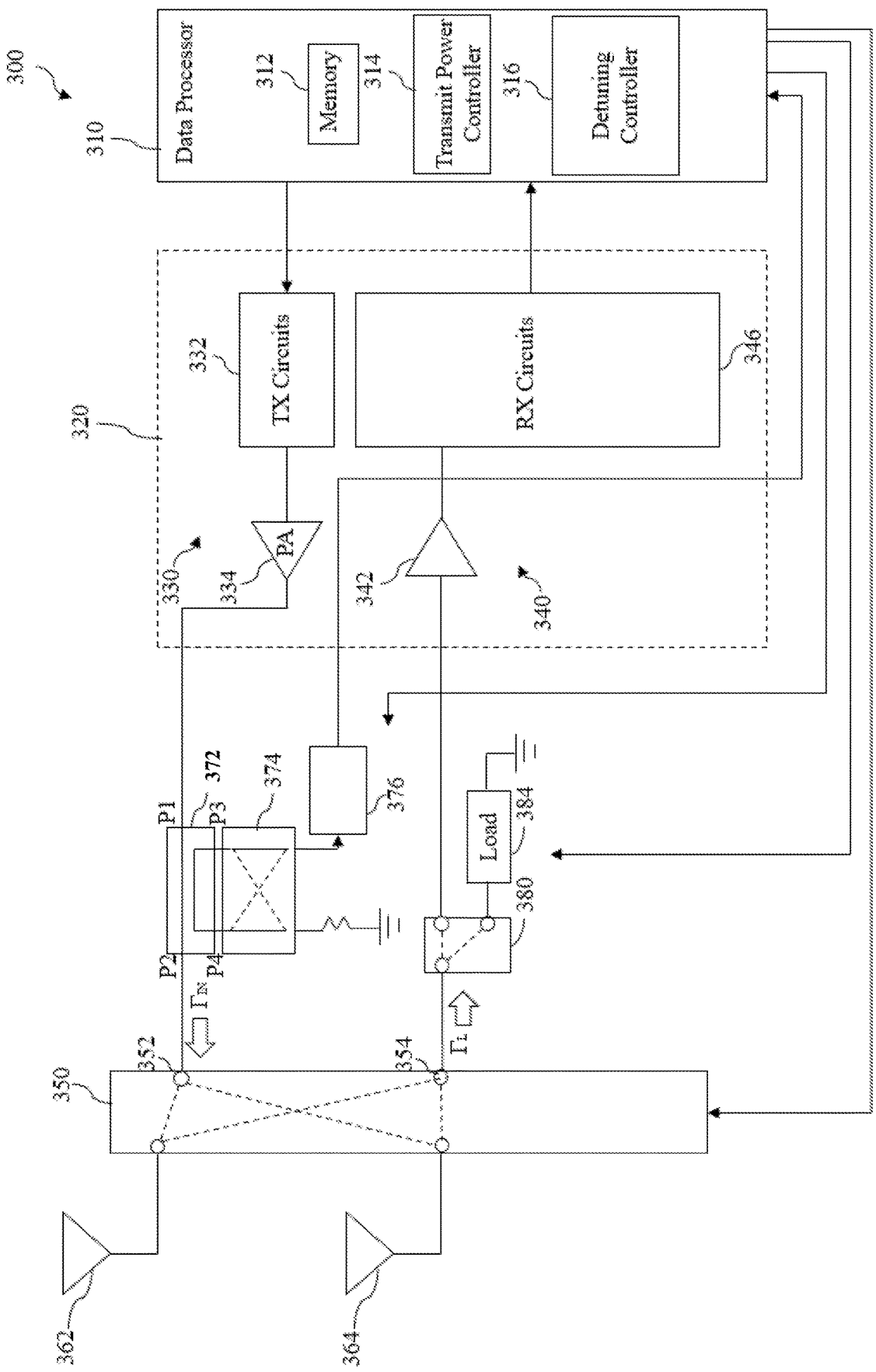
FIG. 3 illustrates an example UE configured with an adjustable load for computation-based detuning in accordance with an aspect of the present disclosure.

In one implementation, an antenna switch module may couple to an adjustable load during the computation-based detuning. The antenna switch module thus doesn't need to switch to select from one load to another but instead the adjustable load is adjusted to provide the (e.g., three) different loads. An example UE 300 with computation-based detuning using an adjustable load 384 is shown in FIG. 3. In this example, the UE 300 includes a data processor 310, a transceiver 320, an antenna switch array 350, and a plurality of antennas including an antenna 362, and an antenna 364. The data processor 310 may also be implemented as a modem. The transceiver 320 includes a transmitter 330 and a receiver 340 that support bi-directional wireless communication. In a transmit path, the data processor 310 processes (e.g., encodes and modulates) data to be transmitted and provides an analog output signal to the transmitter 330. A memory 312 for the processor 310 may store program codes and data for the data processor 310. A transmit power controller 314 may control the transmit power of the transceiver 320. A detuning controller 316 may control the ON/OFF status of the switches in antenna switch array 350 and also in an antenna switch module 380. Each of the memory 312, the transmit power controller 314, and the detuning controller 316 may be internal to data processor 310 (as shown in FIG. 3) or external to data processor 310. While element 380 is referred to as an antenna switch module herein, it will be understood that the components thereof need not be packaged together in a hardware module. Components may be included in a circuit or chip which is not packaged as a module or may be implemented individually. Similarly, the description of antenna switch modules above does not require that such functionality be implemented by components packaged together in a hardware module.

Within the transmitter 330, TX circuits 332 amplify, filter, and upconvert the output signal from baseband to RF and provide a modulated signal. The TX circuits 332 may include amplifiers, filters, mixers for up conversion from baseband to RF, an oscillator, a local oscillator (LO) generator, a phase locked loop (PLL), and other suitable components. A power amplifier (PA) 334 receives and amplifies the modulated signal and provides an amplified RF signal having the proper output power level as controlled by transmit power controller 314.

Antenna switch array 350 is configured to select a pair of antennas such as antennas 362 and 364. One of the antennas will be selected by antenna switch array 350 such that it is the first antenna that couples to transmitter 330 during the computation-based detuning of a second antenna that couples to antenna switch module 380. For example, antenna switch array 350 may have a first configuration in which transmitter 330 couples to antenna 362 and in which an input terminal of antenna switch module 380 couples to antenna 364. Similarly, antenna switch array 350 may have a second configuration in which transmitter 330 couples to antenna 364 and in which the input terminal of antenna switch module 380 couples to antenna 362. The first configuration may be deemed to be a "through" configuration whereas the second configuration may be deemed be a "cross" configuration.

During an operation mode (no computation-based detuning) in which the second antenna is not detuned but instead receives a signal, antenna switch module 380 couples from this second selected by antenna switch array 350 to receiver 340. In a receive path of receiver 340, a received RF signal from this selected antenna (or antennas) is amplified by a low noise amplifier (LNA) 342. An LNA output signal from LNA 342 is processed by RX circuits 346 to provide an analog baseband input signal to the data processor 310. The RX circuits 346 may include amplifiers, filters, mixers for down conversion from RF to baseband, an oscillator, an LO generator, a PLL, and other suitable components. In the characterization mode for the computation-based detuning, antenna switch module 380 is instead configured to couple the second antenna (for example antenna 364 or antenna 362) in the 2-port network being characterized to an adjustable load 384. Similarly, antenna switch module 380 also couples the second antenna to adjustable load 384 during the operation mode when the second antenna is detuned instead of being used to receive.

In the following discussion, it will be assumed without loss of generality that antenna 362 is the first antenna in the two-port network whereas antenna 364 is the second antenna. Antenna switch module 380 is thus configured into a through configuration in which a switch port 352 is the first port for antenna 362 whereas a switch port 354 is the second port for antenna 364.

To measure the reflection coefficient during the characterization mode, UE 300 includes a directional coupler 372 coupled between switch port 352 and power amplifier 334. Directional coupler 372 samples a forward signal propagated from power amplifier 334 to antenna 362 and also samples a reflected signal that reflects from switch port 352 back to power amplifier 334. A signal detector 376 determines a ratio of the reflected signal to the forward signal to form a reflection coefficient for switch port 352. This reflection coefficient may also be denoted as $\Gamma_{IN}$. In one implementation, signal detector 376 may detect both the amplitude and phase of the forward and reflected signals such that $\Gamma_{IN}$ is a complex number. In other implementations, signal detector 376 may detect only a magnitude of the forward and reflected signals such that $\Gamma_{IN}$ is a real number. A smaller input reflection coefficient translates to a better matching for the transmitting antenna. For example, $\Gamma_{IN}=0$ implies no reflected power.

The directional coupler 372 may receive the forward RF signal at a first port P1, provide an output RF signal at a second port P2, and provide the sample of the forward signal at a third port P3. The directional coupler 372 may also provide a sample of the reflected RF signal at a fourth port P4. Signal detector 376 may be a square-law power detector, a phase and amplitude signal detector, or another suitable type of signal detector. Signal detector 376 may receive RF signals at different ports of directional coupler 372 and may measure the voltage, current, power, and/or other characteristics of the RF signals. Signal detector 376 may couple to the third and fourth ports through a switch 374. Signal detector 376 may also measure the forward signal propagating to switch port 352 or the reflected signal from switch port 352 based upon a state of the switch 374. The switch 374 may be a "2" pole "2" throw (DPDT) switch. In one state, the switch 374 connects the antenna side of the directional coupler 372 to a matched load coupled to ground and the amplifier side of directional coupler 372 to the detector 376. In another state, the switch 374 connects the antenna side of directional coupler 372 to the detector 376 and the amplifier side of directional coupler 372 to a terminating impedance such as the matched load.

By using one directional coupler 372 in conjunction with the switch 374, a single directional coupler may be used in place of two directional couplers to perform signal measurements on a transmission line as described herein. The switch 374 switches between the ports on directional coupler 372 to allow for measurements in either direction, i.e., measurements of signals from the PA 334 and measurements of signals reflected back from the transmitting one of the antennas such as during the transmission of an SRS or other suitable signal.

During the transmission from the first antenna, when the switch 374 is set in a first state, the directional coupler 372 samples a voltage $V_f$ indicative of the forward signal. When the switch 374 is set in a second state, the directional coupler 372 samples a voltage $V_r$ indicative of the reflected signal. More specifically, a voltage $V_f$, which is indicative of the forward signal, may be measured in some implementations when the switch 374 is configured such that port P4 couples to a terminating impedance and port P3 of the directional coupler 372 feeds into signal detector 376. As power is a function of voltage and current, the voltage $V_f$ is proportional to the forward power. Conversely, voltage $V_r$, which is indicative of the reflected signal, may be measured when the switch 374 is configured such that port P4 couples to the detector 376 and port P3 couples to a terminating impedance. As power is a function of voltage and current, as described above, the voltage $V_r$ is proportional to the reverse power.

After determining the voltage $V_f$ and the voltage $V_r$, the ratio $V_r/V_f$ may be determined. As described herein, a single directional coupler may be used to generate voltages $V_r$ and $V_f$. The voltages $V_r$ and $V_f$ are proportional to the forward power and reflected power, respectively. The input reflection coefficient is defined in the following Equation (1) as:

$\Gamma_{IN}=V_r/V_f$            Equation (1)

Input reflection coefficient $\Gamma_{IN}$ may be used to determine other figure of merits describing an RF channel, such as a voltage standing wave ratio (VSWR). The VSWR is defined in the following Equation (2):

$VSWR=(1+|\Gamma_{IN}|)/(1-|\Gamma_{IN}|)$            Equation (2)

In some implementations, signal detector 376 is capable of calculating the input reflection coefficient $\Gamma_{IN}$, and/or other figures of merit (e.g., the VSWR), from the measurements of $V_f$ and $V_r$ and report the calculated results to the data processor 310 as controlled by detuning controller 316. In some implementations, signal detector 376 includes an analog-to-digital converter (ADC) that digitizes the $V_r$ and $V_f$ measurements and provides their digitized values. The digitized values of the voltages $V_r$ and $V_f$ may be transmitted to the data processor 310. Circuitry within the data processor 310 may store the information so that the input reflection coefficient $\Gamma_{IN}$, and/or other figures of merit related, may be calculated.

Smaller values of $\Gamma_{IN}$ indicate less reflection and a better match between the antenna and the radio (or the antenna and the transmission line). As may be determined from Equation (1) above, the lowest possible value for the input reflection coefficient is 0. When the input reflection coefficient is 0, no reflections are occurring, i.e., the antenna and the radio or the antenna and the transmission medium are perfectly matched. No power is thus being reflected when $\Gamma_{IN}$ is 0. As reflections increase, $\Gamma_{IN}$ increases. Performance may decrease as $\Gamma_{IN}$ increases. Accordingly, lower values of $\Gamma_{IN}$ may be preferable. To address these mismatches, the UE 115 may include an antenna tuning network (e.g., tuners, not illustrated) coupled to the antennas to improve antenna impedance matching in light of $\Gamma_{IN}$ and/or other figure of merits (e.g., the VSWR). Should signal detector 376 be able to detect complex values, using both the real and the imaginary components of $\Gamma_{IN}$ may improve the tuning process.

However, minimizing $\Gamma_{IN}$ may not directly translate to maximizing the TRP because the transmitted power is coupled to other antennas and dissipated in circuits such as LNA 342 instead of radiating into air. Accordingly, to better detune the coupled antennas, determining the input reflection coefficient $\Gamma_{IN}$ alone may not be sufficient. The computation-based detuning disclosed herein advantageously determines the scattering parameters between a transmitting antenna and a coupled receive antenna so that the detuning of the coupled receive antenna may be improved.

The computations by data processor 310 of the scattering parameters from the input reflection coefficient $\Gamma_{IN}$ will now be discussed in more detail. To compute the scattering parameters, detuning controller 316 sets the adjustable load 384 to a first impedance value and a first measurement of the input reflection coefficient is performed. Then the adjustable load 384 is set to a second impedance value and a second measurement of the input reflection coefficient is performed. Finally, the adjustable load 384 is set to a third impedance value and a third measurement of the input reflection coefficient is performed. Each of these measurements may occur during transmission of a corresponding reference signal. Should separate reference signals be used, there would thus be three separate reference signal transmissions for the three measurements. Alternatively, two of the measurements (or all three) may be performed during the transmission of a single reference signal. From these three measurements, data processor 310 computes the scattering parameters S11, S22, S21, and S12. With respect to this computation, the impedance of the adjustable load 384 determines a load reflection coefficient $\Gamma_L$, which is a function of the adjustable load impedance 384 and a characteristic impedance. The impedance of the adjustable load 384 may thus be converted by data processor 310 in the load reflection coefficient. The computation of the scattering parameters may then use the relationship between the input reflection coefficient $\Gamma_{IN}$ and the load reflection coefficient $\Gamma_L$ as given by the following Equation (3):

$$\Gamma_{IN} = S_{11} + \frac{S_{12}S_{21}\Gamma_L}{1 - S_{22}\Gamma_L} \quad \text{Equation (3)}$$

The scattering parameters $S_{11}$, $S_{22}$, and the product $S_{12}*S_{21}$ describe the two-port channel between the TX antenna 362 and the RX antenna 364. To simplify the notation, the input reflection coefficient $\Gamma_{IN}$ may also be denoted as M (shorthand for a measurement of the input reflection coefficient). Similarly, the load reflection coefficient $\Gamma_L$ may be denoted as L. Thus, Equation (3) may be rewritten as the following Equation (4):

$$M = S_{11} + MLS_{22} + L(S_{12}S_{21} - S_{11}S_{22}) \quad \text{Equation (4)}$$

A first input reflection coefficient measurement M1 is then performed with adjustable load 384 configured to provide a first load reflection coefficient L1. Similarly, a second measurement M2 is measured using a second load reflection coefficient L2. Finally, a third measurement M3 is measured using a third load reflection coefficient L3. From the values M1, M2, M3, L1, L2, and L3, the corresponding three versions of Equation (4) may be solved to determine the three unknowns $S_{11}$, $S_{22}$, and $S_{12}*S_{21}$. The scattering coefficient $S_{21}$ (or $S_{12}$) may then be determined from a square root of $(S_{12}*S_{21})$.

These three versions of Equation 4 can be written in matrix form as shown in the following Equation (6):

$$\begin{bmatrix} 1 & M_1L_1 & L_1 \\ 1 & M_2L_2 & L_2 \\ 1 & M_3L_3 & L_3 \end{bmatrix} \cdot \begin{bmatrix} S_{11} \\ S_{12} \\ \Delta \end{bmatrix} = \begin{bmatrix} M_1 \\ M_2 \\ M_3 \end{bmatrix} \quad \text{Equation (5)}$$

in which $\Delta = S_{12}S_{21} - S_{11}S_{22}$.

Accordingly, the two-port scattering parameters can be computed based on Equation (5) using the method of solving three linear equations with three unknowns. Once the two-port scattering parameters are computed, the two-port channel represented by the two-port scattering parameters is characterized.

Given the values M1, M2, and M3 corresponding to L1, L2, and L3, data processor 310 may solve Equation (5) to obtain the scattering parameters describing the two-port channel from the transmitting antenna 362 to the receiving antenna 364. As the two-port channel is characterized, the data processor 310 may further compute an optimum load that most effectively detunes antenna 364, for example as discussed further herein with respect to FIG. 5. At a conclusion of the characterization mode prior to the operation mode, detuning controller 318 may set the adjustable load 384 to the optimum load or to a value in the tunable range that is closest to the optimum load. The coupling between antennas 362 and 364 is thus advantageously minimized or reduced such that the total radiated power from UE 300 as antenna 362 transmits during the detuning portion of the operation mode is increased or maximized. Note that antenna 364 would not be detuned during a receive portion of the operation mode during which antenna 364 receives a signal that is coupled to the receive path of receiver 340. An alternative implementation will now be discussed in which the adjustable load 384 is replaced by three fixed loads.

Computation-Based Detuning with Fixed Loads

Figure 4:
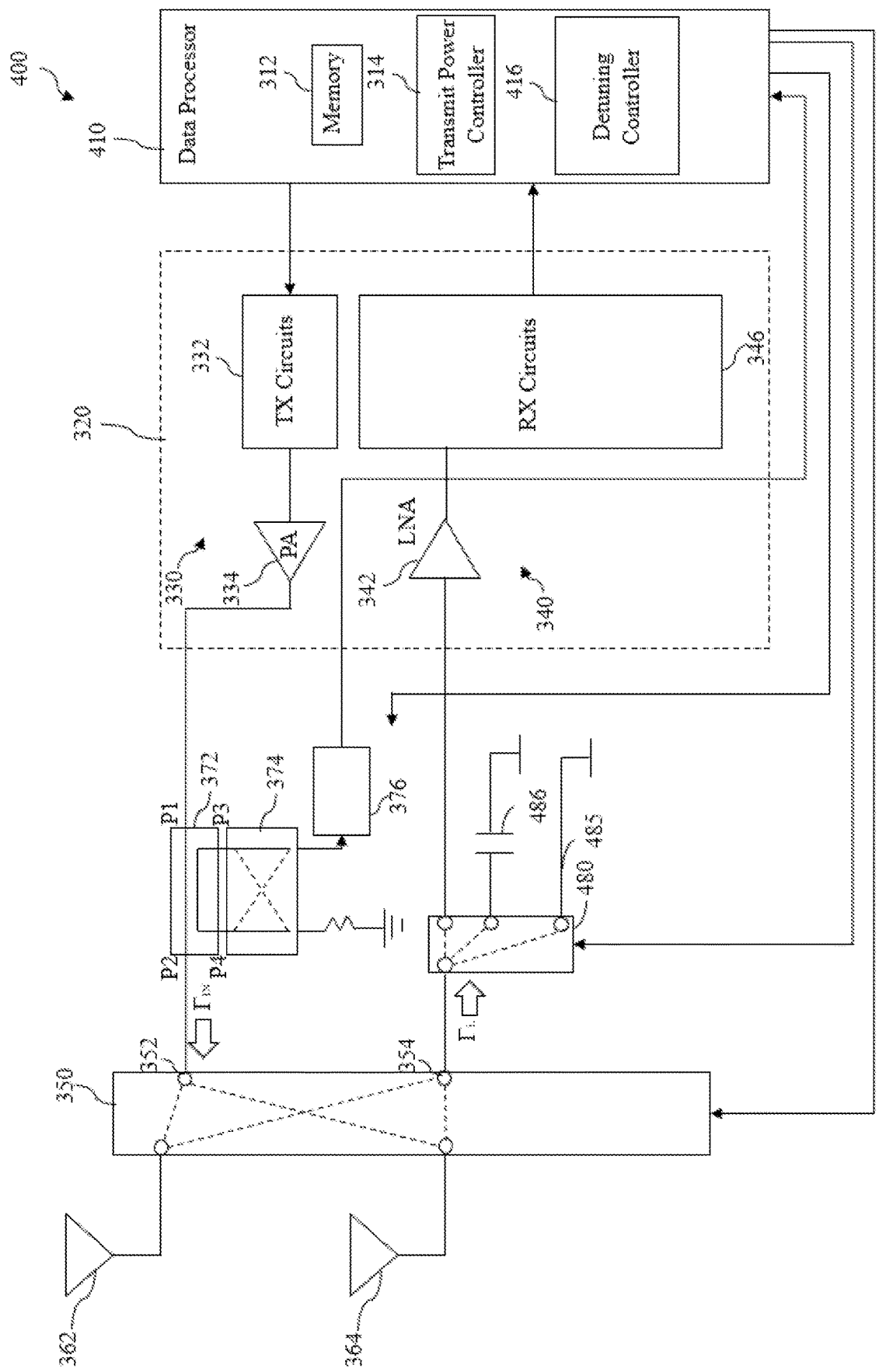
FIG. 4 illustrates an example UE configured with fixed loads for computation-based detuning in accordance with an aspect of the present disclosure.

An example UE 400 with computation-based detuning using fixed loads is shown in FIG. 4. Antennas 362 and 364, switch array 350, transceiver 320, directional coupler 372, and switch 374 are arranged as discussed for UE 300. But an antenna switch module 480 no longer selects between the receive path to LNA 342 and an adjustable load to couple the selected element to switch port 354. Instead, antenna switch module 480 has a first configuration in which switch port 354 couples to the receive path, a second configuration in which switch port 345 couples to a capacitor 486 with a known capacitance, a third configuration in which switch port 354 couples through a short circuit 485 to a terminating impedance such as 50Ω, and a fourth configuration in which the switch port 354 is open circuited from these elements. The second, third, and fourth configurations are used during the computation mode. Should antenna 364 be used for receiving during a receive portion of the operation mode, antenna switch module 380 uses the first configuration.

In the computation mode, the load reflection coefficient is thus determined by the sequential selection of the open circuit, short circuit 485, and capacitor 486. As an adjustable load is generally a more expensive and complicated component than a passive capacitor and a short circuit, the use of the fixed loads may reduce manufacturing costs and complexity. A data processor 410 is analogous to data processor 310 and thus contains memory 312 and transmit power controller 314. A detuning controller 416 controls antenna switch array 350 as discussed for UE 300. In addition, detuning controller 416 controls antenna switch module 480 to sequentially select each fixed load (the open circuit, capacitor 486, and short circuit 485 during the computation of the scattering parameters. Each selected fixed load corresponds to a load reflection coefficient. Detuning controller 416 may thus calculate the scattering parameters analogously as discussed for Equation 5 discussed above.

In this example, antenna 362 again forms the first antenna whereas antenna 364 forms the second antenna. But this selection is arbitrary such that antenna 364 may be the first antenna (the transmitting antenna in the two-port network being characterized) whereas antenna 362 may be the second antenna (the receiving antenna in the two-port network being characterized).

In a first measurement M1 of the input reflection coefficient at directional coupler 372 such as during the transmission of a first reference signal, detuning controller 416 may configure antenna switch module 480 so that switch port 354 is open circuited with respect to the receive path to LNA 342, capacitor 486, and short circuit 485. The resulting disconnection of antenna 364 from any loads is also denoted herein as a load L1 of "OPEN." A first reflection coefficient measurement M1 may then be made. Subsequently, the detuning controller 416 may configure antenna switch module 480 to couple the switch port 354 (and thus antenna 364) to the capacitor 486. The capacitance of the capacitor 486 is a known value and functions as a second load L2, also denoted herein as "CAP." A second reflection coefficient measurement M2 may then be performed such as during the transmission of the first reference signal (or during the transmission of a second reference signal should the first reference signal duration not be long enough for two separate reflection coefficient measurements). Finally, detuning controller 416 may configure antenna switch module 480 to couple switch port 354 (and thus the antenna 364) through the short circuit 485 to the terminating impedance. This load L3 is also denoted herein "SHORT." A third reflection coefficient measurement M3 may then be performed such as during the first reference signal transmission, during the second reference signal transmission, or during a third reference signal transmission depending upon the time required to perform the reflection coefficient measurements and the duration of the reference signal transmissions. Once the data processor 410 acquires values of M1, M2, and M3 corresponding to L1, L2, and L3, it may solve the Equation (5) to compute the scattering parameters describing the two-port channel between antennas 362 and 364. Since the scattering parameters are then determined, data processor 310 may determine which one of the three fixed loads OPEN, SHORT, and CAP provides the greatest detuning such as described with respect to FIG. 5. At a conclusion of the computation mode, detuning controller 416 may then configure antenna switch module 480 to select for the appropriate load accordingly. While the use of three known loads is described with respect to certain examples above in order to compute a certain set of scattering parameters, a greater number of loads may be utilized (e.g., when in a configuration with more than two ports and/or more than three unknown scattering parameters). Alternatively fewer than three loads may be utilized (e.g., when certain scattering parameters are already known or characterized through another method or procedure).

Figure 5:
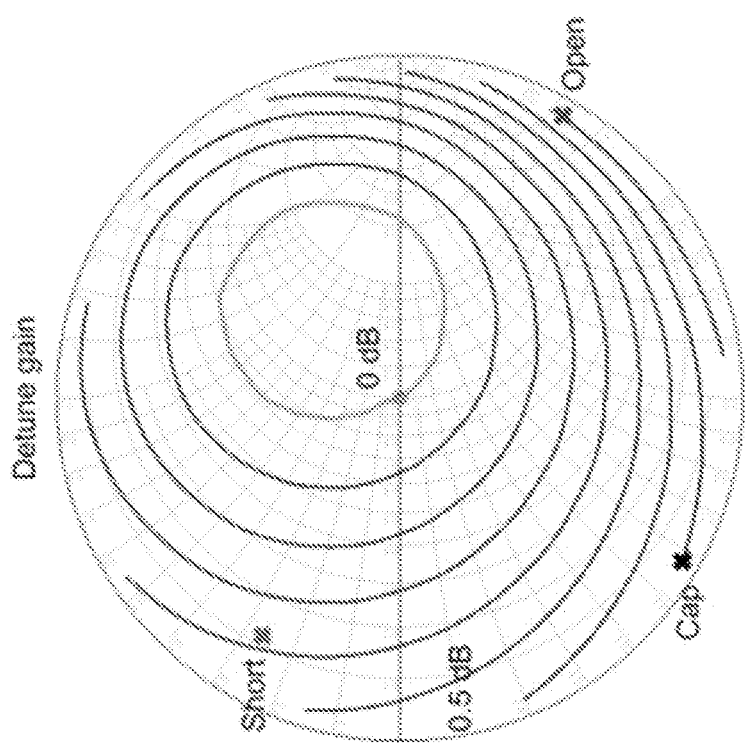
FIG. 5 shows a Smith chart with contours of detuning gain in accordance with an aspect of the disclosure.

With regard to each load, a detune can be defined with respect to the power taken by the two-port network as a function of the load impedance. Contours of equal detune gain are plotted in a Smith chart as shown in FIG. 5 in increments of 0.1 dB. A center contour that passes through a normalized impedance of 1.0 corresponds to a 0 dB detuning gain. Such a detuning gain is undesirable as it corresponds to a highly coupled state in which less power is radiated into free space from the first antenna. The SHORT load corresponds most closely to a contour of 0.4 dB in detuning gain. The CAP load corresponds most closely to a contour representing 0.7 dB in detuning gain. Finally, the OPEN load corresponds most is closely to a contour representing 0.8 dB in detuning gain. Therefore, the OPEN load will be selected as a load for the coupled antenna during the detuning portion of the operation mode.

An analogous detuning may occur using adjustable load 384 as discussed with regard to UE 300. After the computation mode has determined the scattering parameters such that the optimal detuning load may be determined, UE 300 may transition into the detuning portion of the operation mode. In that state, detuning controller 316 may set adjustable load 384 to provide the optimal detuning load. Should the tuning range of adjustable load 384 not cover the optimal detuning load, controller 316 may set adjustable load 384 to a value in its tuning range that is closest to the optimal detuning load.

Figure 6:
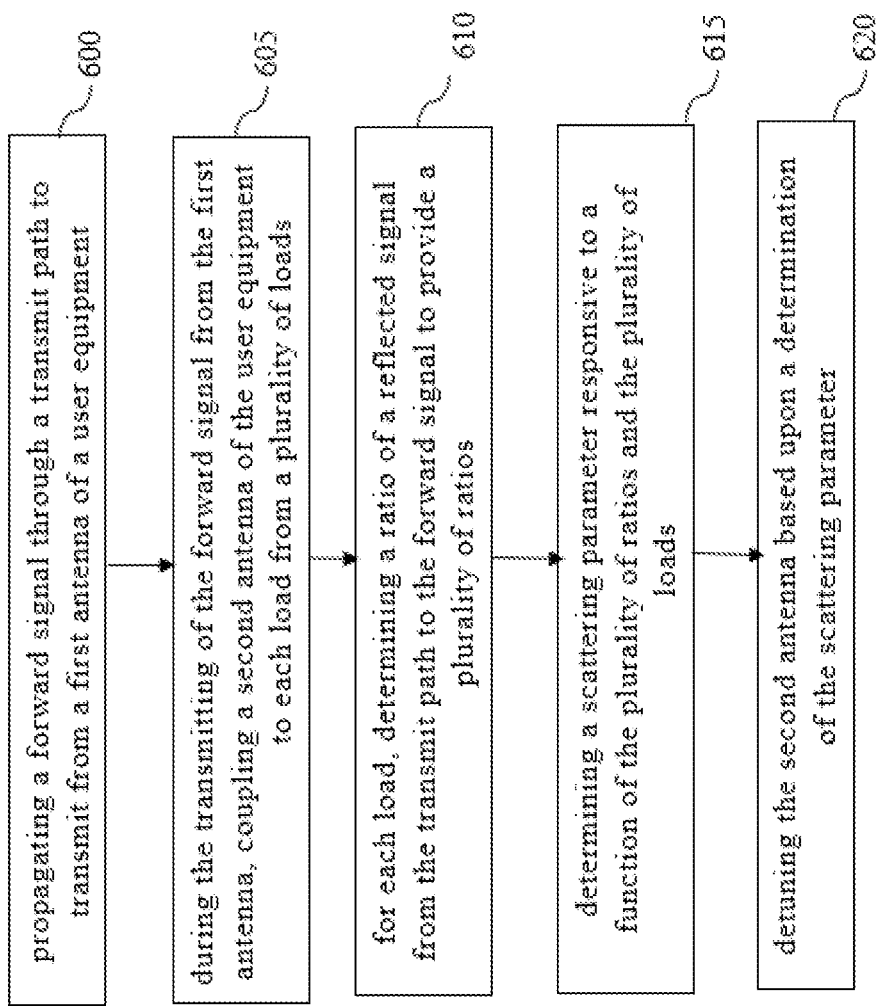
FIG. 6 is a flowchart for a method of computation-based detuning in accordance with an aspect of the present disclosure.

A method of computation-based detuning will now be discussed with regard to the flowchart of FIG. 6. The method includes an act 600 propagating a forward signal through a transmit path to transmit the forward signal from a first antenna of a user equipment. The operation of UEs 300 and 400 during the computation mode while antenna 362 transmits is an example of act 600. The method also includes an act 605 that occurs during act 600 and includes coupling a second antenna of the user equipment to each load from a plurality of loads. The coupling of antenna 364 in UE 300 to adjustable load 384 while the adjustable load 384 is sequenced through three different load values is an example of act 605. Similarly, the coupling of antenna 364 in UE 400 to sequence through the open circuit, capacitor 486, and short circuit 485 is another example of act 605. The method further includes an act 610 for each load of act 605. Act 610 includes determining a ratio of a reflected signal from the transmit path to the transmit path's forward signal to provide a plurality of ratios. The operation of signal detector 376 and detuning controller 316 (or 416) to determine the ratios is an example of act 610. Moreover, the method includes an act 615 of determining a scattering parameter responsive to a function of the plurality of ratios and the plurality of loads. The computation by data processor 310 or 410 to determine the scattering parameters is an example of act 615. Finally, the method includes an act 620 of detuning the second antenna based upon a determination of the scattering parameter. The detuning of antenna 364 in UE 300 or 400 is an example of act 620.

The disclosure will now be summarized in the following example clauses.

Clause 1. An apparatus for wireless communication, comprising:
 a plurality of antennas including a first antenna and a second antenna;
 a first amplifier;
 a plurality of loads;
 an antenna switch module;

an antenna switch array having a first configuration in which an output signal path from the first amplifier is coupled to the first antenna and in which the antenna switch module is coupled to the second antenna;

wherein the antenna switch module is configured to couple to a selected load from the plurality of loads during a calibration mode; and a signal detector configured to detect a forward signal from the output signal path to provide a detected forward signal and to detect a reflected signal from the output signal path to provide a detected reflected signal.

Clause 2. The apparatus of clause 1, wherein the plurality of loads comprises three loads.

Clause 3. The apparatus of clause 2, wherein a first load from the three loads comprises a capacitor.

Clause 4. The apparatus of clause 2, wherein a second load from the three loads comprises an open circuit.

Clause 5. The apparatus of clause 2, wherein a third load from the three loads comprises a short to ground.

Clause 6. The apparatus of clause 2, wherein a first load from the three loads comprises a capacitor, a second load from the three loads comprises an open circuit, and a third load from the three loads comprises a short to ground.

Clause 7. The apparatus of any of clauses 2-6, further comprising:

a controller configured to control the antenna switch module to sequence the selected load through the three loads, and to determine, at each value of the selected load, a corresponding input reflection coefficient equaling a ratio of the detected forward signal and the detected reflected signal to provide three input reflection coefficients.

Clause 8. The apparatus of clause 7, wherein the controller is further configured to determine a scattering parameter for a coupling between the first antenna and the second antenna responsive to a function of the three input reflection coefficients.

Clause 9. The apparatus clause 8, wherein the controller is further configured so that the function also depends upon the three loads.

Clause 10. The apparatus of any of clauses 8-9, wherein the controller is further configured to control the antenna switch module to couple to one of the three loads to detune the second antenna during a detuning portion of an operation mode.

Clause 11. The apparatus of any of clauses 1-10, wherein the antenna switch array is further configured in a second configuration to couple the output signal path from the first amplifier to the second antenna and to couple the antenna switch module to the first antenna.

Clause 12. The apparatus of any of clauses 1-11, wherein the apparatus comprises a user equipment.

Clause 13. The apparatus of clause 10, further comprising:

a second amplifier, wherein the first antenna is a transmit antenna of the apparatus and the second antenna is a receive antenna of the apparatus, and wherein the antenna switch module is further configured to couple to the second amplifier during a receive portion of the operation mode.

Clause 14. The apparatus of clause 13, wherein the first amplifier is a power amplifier and wherein the second amplifier is a low-noise amplifier.

Clause 15. The apparatus of any of clauses 1-14, further comprising:

a directional coupler coupled to the output path of the first amplifier.

Clause 16. The apparatus of clause 15, wherein the signal detector is configured to selectively couple to a first port of the directional coupler to detect the forward signal and to selectively couple to a second port of the directional coupler to detect the reflected signal.

Clause 17. An apparatus for wireless communication, comprising:

a plurality of antennas including a transmit antenna and a receive antenna;

a power amplifier;

a low-noise amplifier;

an adjustable load;

an antenna switch module having a first configuration the antenna switch module is coupled to the low-noise amplifier and having a second configuration in which the antenna switch module is coupled to the adjustable load;

an antenna switch array having a first configuration in which an output signal path from the power amplifier is coupled to the transmit antenna and in which the antenna switch module is coupled to the receive antenna; and a signal detector configured to detect a forward signal from the output signal path and a reflected signal from the output signal path.

Clause 18. The apparatus of clause 17, further comprising:

a controller configured to adjust the adjustable load to sequence through a plurality of load values and configured to determine an input reflection coefficient from a ratio of the forward signal and the reflected signal at each load value.

Clause 19. The apparatus of clause 18, wherein the controller is further configured so that the plurality of load values equals three load values and to determine three corresponding input reflection coefficients, and wherein the controller is further configured to determine a scattering parameter responsive to a function of the three load values and the three corresponding input reflection coefficients.

Clause 20. The apparatus of clause 19, wherein the controller is further configured to adjust the adjustable load to detune the receive antenna responsive to a determination of the scattering parameter.

Clause 21. A method for wireless communication, comprising:

propagating a forward signal through a transmit path to transmit the forward signal from a first antenna of a user equipment;

during the transmitting of the forward signal from the first antenna, coupling a second antenna of the user equipment to each load from a plurality of loads;

for each load, determining a ratio of a reflected signal from the transmit path to the forward signal to provide a plurality of ratios;

determining a scattering parameter responsive to a function of the plurality of ratios and the plurality of loads; and detuning the second antenna based upon a determination of the scattering parameter.

Clause 22. The method of clause 21, wherein detuning the second antenna comprises coupling the second antenna to a selected load from the plurality of loads.

Clause 23. The method of any of clauses 21 and 22, further comprising:
transmitting a data signal through the first antenna while the second antenna is detuned.

Clause 24. The method of any of clause 21-23, wherein the plurality of loads includes an open circuit, a short circuit to ground, and a capacitor.

Clause 25. A user equipment for wireless communication, comprising:
a first antenna;
a second antenna;
a power amplifier;
a directional coupler coupled between the power amplifier and the first antenna;
a low-noise amplifier;
a plurality of loads; and
a controller configured to:
control the second antenna to disconnect from the low-noise amplifier and connect to a selected load from the plurality loads while the power amplifier is transmitting through the first antenna.

Clause 26. The user equipment of clause 25, wherein the selected load increases a gain of the first antenna.

Clause 27. The user equipment of clause 25, wherein the controller is further configured to:
connect the second antenna to the low-noise amplifier when the power amplifier is not transmitting through the first antenna.

Clause 28. The user equipment of any of clauses 25-27, wherein the plurality of loads includes a capacitor and a short circuit to ground.

Clause 29. The user equipment of clause 28, wherein the plurality of loads further includes an open circuit.

It should be noted that the methods described herein describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
a plurality of antennas including a first antenna and a second antenna;
a first amplifier;
a plurality of loads;
an antenna switch module;
an antenna switch array having a first configuration in which an output signal path from the first amplifier is coupled to the first antenna and in which an input terminal of the antenna switch module is coupled to the second antenna;
wherein the antenna switch module is configured to couple to a selected load from the plurality of loads during a calibration mode; and
a signal detector configured to detect a forward signal from the output signal path to provide a detected forward signal and to detect a reflected signal from the output signal path to provide a detected reflected signal.

2. The apparatus of claim 1, wherein the plurality of loads comprises three loads.

3. The apparatus of claim 2, wherein a first load from the three loads comprises a capacitor.

4. The apparatus of claim 2, wherein a second load from the three loads comprises an open circuit.

5. The apparatus of claim 2, wherein a third load from the three loads comprises a short to ground.

6. The apparatus of claim 2, wherein a first load from the three loads comprises a capacitor, a second load from the three loads comprises an open circuit, and a third load from the three loads comprises a short to ground.

7. The apparatus of claim 6, further comprising: a controller configured to control the antenna switch module to sequence the selected load through the three loads, and to determine, at each value of the selected load, a corresponding input reflection coefficient equaling a ratio of the detected forward signal and the detected reflected signal to provide three input reflection coefficients.

8. The apparatus of claim 7, wherein the controller is further configured to determine a scattering parameter describing for a coupling between the first antenna and the second antenna responsive to a function of the three input reflection coefficients.

9. The apparatus of claim 8, wherein the controller is further configured so that the function also depends upon the three loads.

10. The apparatus of claim 8, wherein the controller is further configured to control the antenna switch module to couple to one of the three loads to detune the second antenna during a detuning portion of an operation mode.

11. The apparatus of claim 1, wherein the antenna switch array is further configured in a second configuration to couple the output signal path from the first amplifier to the second antenna and to couple the antenna switch module to the first antenna.

12. The apparatus of claim 1, wherein the apparatus comprises a user equipment.

13. The apparatus of claim 10, further comprising: a second amplifier, wherein the first antenna is a transmit antenna of the apparatus and the second antenna is a receive antenna of the apparatus, and wherein the antenna switch module is further configured to couple to the second amplifier during a receive portion of the operation mode.

14. The apparatus of claim 13, wherein the first amplifier is a power amplifier and the second amplifier is a low-noise amplifier.

15. The apparatus of claim 1, further comprising: a directional coupler coupled to the output path of the first amplifier.

16. The apparatus of claim 15, wherein the signal detector is configured to selectively couple to a first port of the directional coupler to detect the forward signal and to selectively couple to a second port of the directional coupler to detect the reflected signal.

* * * * *